United States Patent
Zagorski

(10) Patent No.: US 8,473,171 B2
(45) Date of Patent: Jun. 25, 2013

(54) APPARATUS AND METHOD FOR OPTIMIZING A VEHICLE COLLISION PREPARATION RESPONSE

(75) Inventor: Chad T. Zagorski, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 847 days.

(21) Appl. No.: 12/248,086

(22) Filed: Oct. 9, 2008

(65) Prior Publication Data

US 2010/0094520 A1    Apr. 15, 2010

(51) Int. Cl.
   *G06F 7/70* (2006.01)
   *G06F 19/00* (2011.01)
   *G06G 7/00* (2006.01)
   *G06G 7/76* (2006.01)

(52) U.S. Cl.
   USPC ............ 701/70; 701/36; 701/93; 701/117; 701/301; 701/302; 340/425.5; 340/435; 340/436; 340/438; 340/459; 340/3.41; 342/70; 342/71; 180/167; 180/169; 367/909

(58) Field of Classification Search
   USPC ............ 701/36, 45, 70, 116, 300, 301, 93, 701/117, 302; 340/3.41, 435, 436, 903, 933, 340/937, 942, 425.5, 438–441, 453, 459, 340/480, 3.1, 3.4, 3.7, 6.1; 342/70–73, 89–90, 342/145, 455; 180/167–169; 367/909
   See application file for complete search history.

(56) References Cited

U.S. PATENT DOCUMENTS

| | | | |
|---|---|---|---|
| 5,461,357 A * | 10/1995 | Yoshioka et al. | 340/435 |
| 5,521,633 A | 5/1996 | Nakajima et al. | |
| 5,798,727 A | 8/1998 | Shirai et al. | |
| 6,147,637 A | 11/2000 | Morikawa et al. | |
| 6,806,826 B2 | 10/2004 | Walton et al. | |
| 6,903,680 B2 | 6/2005 | Samukawa et al. | |
| 6,926,374 B2 * | 8/2005 | Dudeck et al. | 303/191 |
| 7,266,454 B2 | 9/2007 | Takahama et al. | |
| 7,295,154 B2 | 11/2007 | Walton et al. | |
| 7,298,289 B1 * | 11/2007 | Hoffberg | 340/903 |
| 7,424,357 B2 * | 9/2008 | Ozaki et al. | 701/70 |
| 7,463,138 B2 * | 12/2008 | Pawlicki et al. | 340/435 |
| 7,551,103 B2 * | 6/2009 | Schofield | 340/903 |
| 7,783,427 B1 * | 8/2010 | Woodell et al. | 701/301 |
| 7,804,440 B1 * | 9/2010 | Orr | 342/20 |
| 7,852,462 B2 * | 12/2010 | Breed et al. | 356/4.01 |
| 2004/0065493 A1 * | 4/2004 | Klotz et al. | 180/169 |
| 2007/0010938 A1 * | 1/2007 | Kubota et al. | 701/200 |
| 2010/0052884 A1 * | 3/2010 | Zeppelin et al. | 340/435 |

* cited by examiner

Primary Examiner — Jack Keith
Assistant Examiner — Rami Khatib
(74) Attorney, Agent, or Firm — Quinn Law Group, PLLC

(57) ABSTRACT

A vehicle has wheels, sensors for generating an input data set, and a controller. The controller is in communication with the sensors, including a first sensor for detecting an obstacle on a road surface in a first manner, and adapted to monitor a boundary of the road surface to determine when the wheels are crossing the boundary. A second sensor detects the obstacle in a second manner, and additional sensors determine inertial data of the vehicle. The controller compares the input data set to calibrated thresholds, and determines an appropriate control response such as autonomous braking based on the results. A method optimizes a collision preparation response in the vehicle by measuring the inertial data, detecting the obstacle using a radar or LiDAR device, and monitoring the boundary using an electro-optical device. A supplemental braking force is automatically applied when the vehicle crosses the boundary while the obstacle is detected.

14 Claims, 3 Drawing Sheets

| | 1 | 2 | 3 | 4 |
|---|---|---|---|---|
| | Road Status | R [ 17 ] | O [ 13 ] | Auto Braking |
| 1 | + | + | Off | + |
| 2 | + | + | - | - |
| 3 | + | + | + | + |
| 4 | + | - | + | - |
| 5 | - | + | Off | + |
| 6 | - | + | - | + |
| 7 | - | + | + | + |
| 8 | - | - | + | - |
| 9 | +/- | - | - | - |

APPARATUS AND METHOD FOR OPTIMIZING A VEHICLE COLLISION PREPARATION RESPONSE

TECHNICAL FIELD

The present invention relates to an apparatus and method for optimizing a collision preparation response in a vehicle.

BACKGROUND OF THE INVENTION

Vehicles equipped with a collision preparation system or CPS utilizes one or more sensors to monitor the path of travel of the vehicle for a potential obstacle, and to ascertain the distance and closing rate to such an obstacle. If the CPS determines that a collision is imminent or likely, various autonomous or semi-autonomous control actions can be executed to thereby minimize the probability of such a collision, or to at least mitigate the effects of a resultant collision. For example, seat belt tension can be automatically adjusted in a limited CPS, and/or an audible alarm can be activated to alert the driver and other vehicle occupants to the imminent collision. In a more advanced CPS, a hydraulic braking system can be stroked or readied so that the braking system can respond more rapidly when the driver ultimately depresses the brake pedal in response to the obstacle. In a highly advanced CPS, at least some degree of autonomous braking response can be used to help slow the vehicle when an obstacle is detected within a predetermined range on the road surface.

A typical CPS relies almost exclusively on radar-based remote scanning devices that utilize long range capabilities. As will be understood by those of ordinary skill in the art, using a long range radar system an electromagnetic (EM) pulse can be transmitted toward the obstacle, with the echo, return, or signature of the EM pulse being returned to the radar device. Interpretation or classification of the signature provides the necessary range and closing rate data required to prepare the CPS for action.

Radar devices offer a relatively extensive detection range of as much as approximately 150-200 meters from the vehicle, and therefore are highly practical scanning devices. However, there are certain inherent limitations in the types of obstacles that can be accurately detected and classified by a radar device. As a result, under certain circumstances the CPS may take an action, or may forego an action, in response to an inaccurately or less than optimally evaluated collision risk, particularly for certain potential off-road obstacles.

SUMMARY OF THE INVENTION

Accordingly, an apparatus and method are provided for optimizing a vehicle response in a host vehicle having a CPS by classifying the surrounding road and inertial status of the vehicle into a current scenario, referred to hereinafter for simplicity as the vehicle road and inertial scenario or VRIS. An appropriate control response is then determined and executed by an electronic control unit or controller in response to the classified VRIS. In one embodiment, the control response includes the autonomous supplemental braking of the vehicle, which can be achieved by increasing an actual braking level from a baseline braking input level that is input by the driver. In this manner, the apparatus and method compensate for an insufficient braking input level when the classified VRIS so indicates.

In particular, the apparatus and method seek to discern information about aspects of the surrounding environment by collecting a set of vehicle information describing the presence of any potential obstacles on the road surface using a variety of sensors. In addition to obstacle detection and ranging information, the sensors measure or detect a set of vehicle inertial and/or performance data such as, but not necessarily limited to, vehicle acceleration, velocity, steering angle and/or steering rate, and braking input levels. At least one of the sensors continuously scans the lane boundary or solid line lane marking to determine if and when the vehicle leaves the road surface, a determination that can in one embodiment be verified using an onboard navigation system. The apparatus and method then classify the collective VRIS and tailor an appropriate control response based on the collective set of information provided by the sensors. A vehicle equipped with the apparatus and using the method of the invention can react in a much wider range of circumstances to mitigate the effects of or avoid a collision with an obstacle, while at the same time minimizing instances of false positive recognition of a given VRIS.

More particularly, the method is executed using the apparatus, which together describe a Vehicle Road and Inertial Scenario Recognition (VRISR) system as described below. The VRISR system is integrated into the architecture of the vehicle and includes an electronic control unit or controller having an algorithm adapted to execute the method, and a plurality of sensors in continuous communication with the controller. The plurality of sensors includes at least one obstacle detection sensor, for example a radio wave or light wave scattering and detection device, e.g., radar, LiDAR, etc., which remotely detects the presence of a potential obstacle in the path of the vehicle and provides the range data necessary for determining the closing rate to the obstacle. Also, the VRISR system includes one or more electro-optical sensors that continuously scan the boundary lines of the road surface and communicates this information to the controller to thereby determine the road status. As used herein, the term "road status" refers to the vehicle's position on or off of a particular road surface, i.e., whether the vehicle is positioned on a paved or primary road surface, or whether the vehicle has crossed a lane boundary or a solid line demarking a boundary of the road surface.

Additional sensors measure a set of vehicle inertial and/or performance values, including but not necessarily limited to an accelerator or throttle level, braking input levels, vehicle speed and/or wheel speed, and steering angle and/or steering rate. The set of vehicle inertial and/or performance values is transmitted or communicated to the controller. The controller then utilizes the sensory data from the obstacle detection sensor, the road status data from the optical sensor, and the set of vehicle inertial and/or performance values, and then compares this information to calibrated thresholds. Depending on the values of the collective information provided by the sensors, the controller can then selectively enable or disable an autonomous control response such as but not limited to an autonomous and variable supplemental braking or braking assist to thereby slow or stop the vehicle in a controlled manner that is appropriate for the classified VRIS.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
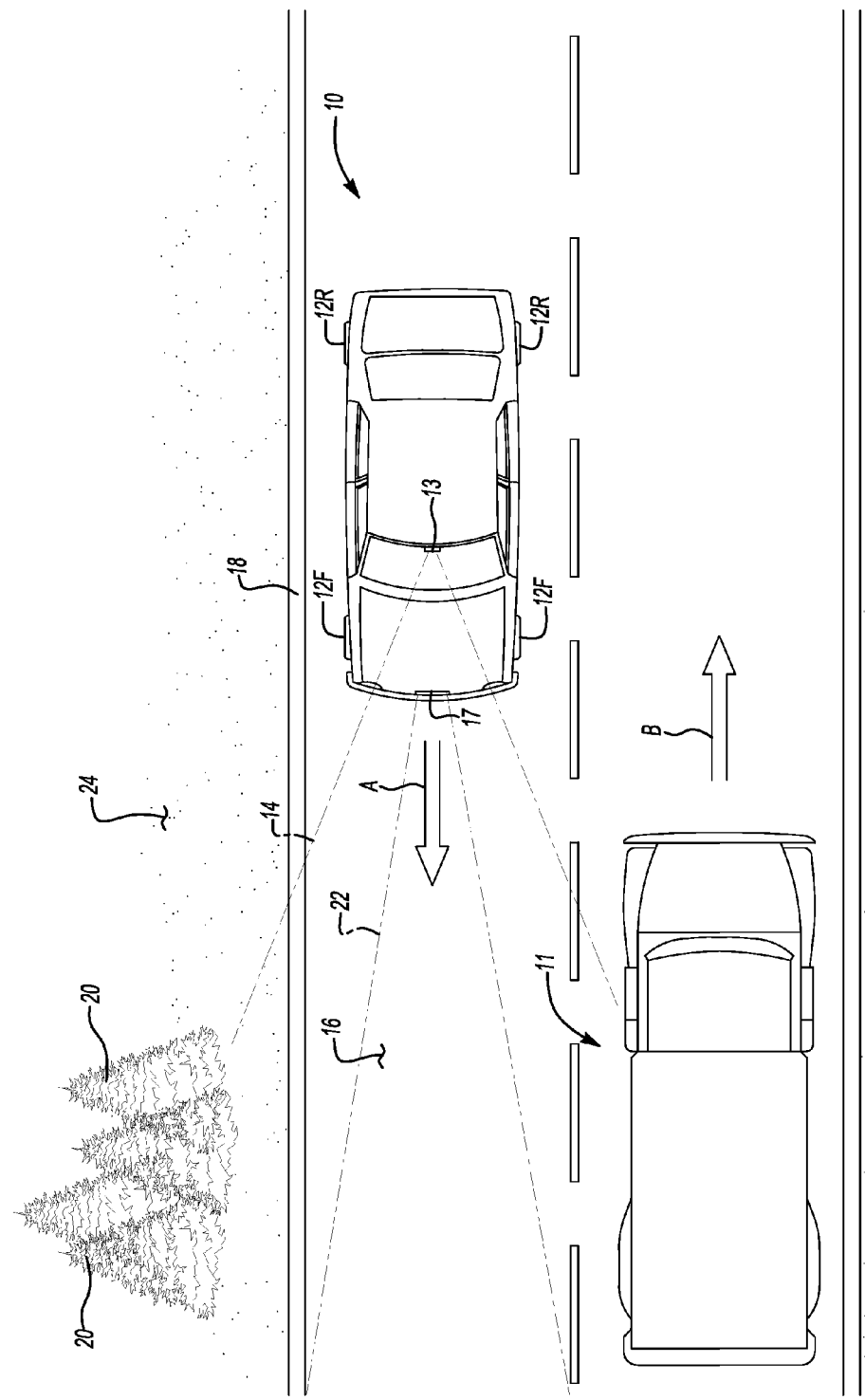
FIG. 1 is a schematic illustration of a vehicle traveling on an exemplary road surface having a boundary line.

With reference to the Figures, wherein like reference numerals refer to like or similar components throughout the several figures, and beginning with FIG. 1, a vehicle 10 is traveling in the direction of arrow A along a road surface 16, with the vehicle 10 having a set of respective front and rear road wheels 12F, 12R in contact with the road surface 16. The road surface 16 is exemplified by a paved highway or surface street, with the boundaries or lanes of the road surface 16 being demarked or delimited via a solid line 18 exemplified by the solid white line that ordinarily demarks the outer limits of a paved lane. The solid line 18 separates the edge or boundary of the pavement of the road surface 16 from an adjacent off-road surface 24, such as dirt, grass, mud, gravel, etc.

Figures 2, 3:
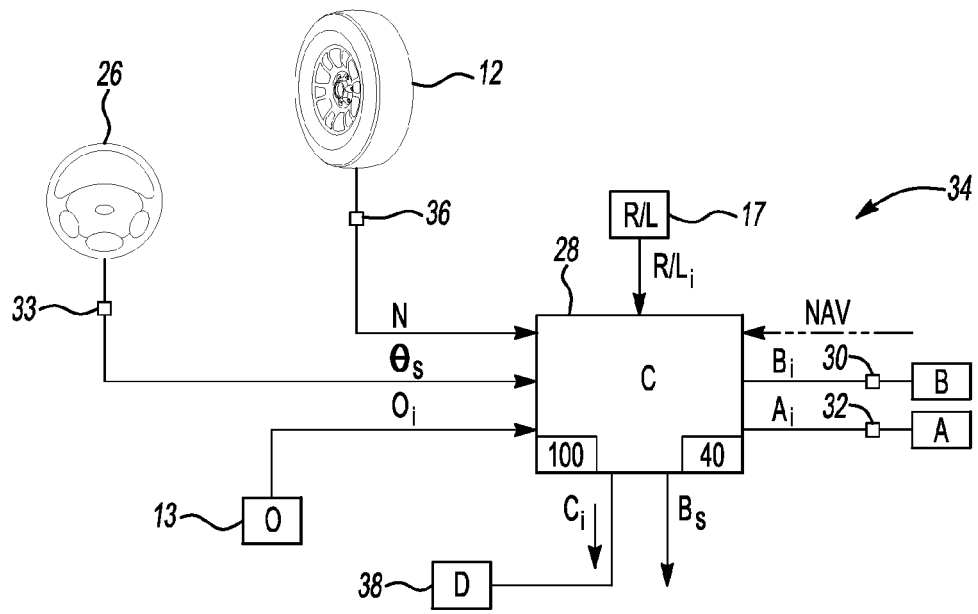
FIG. 2 is a schematic illustration of a controller usable with the vehicle of FIG. 1.
FIG. 3 is a table describing an autonomous braking status as it relates to the road status and sensory status of the vehicle of FIG. 1.

The vehicle 10 is equipped with a vehicle road and inertial scenario recognition (VRISR) system 34, as shown in FIG. 2, which includes a first sensor 13 and a second sensor 17. The sensors 13, 17 are each operatively connected to the vehicle 10 at a suitable position or location therein. The first sensor 13 is configured as an electro-optical imaging device such as a digital image processor, a camera, an optical scanner, or any other suitable type of visual detection system. The first sensor 13 can be mounted to a rear view mirror post (not shown) or other sufficiently protected forward structure or surface of the vehicle 10, and generates an optical scanning beam or zone 14 covering the immediate path of the vehicle 10, as well as the solid line 18 adjacent to the vehicle 10.

The first sensor 13 is operable for continuously scanning the path of the vehicle 10 for an object or potential obstacle. The obstacle can include any suitably sized object or being such as an oncoming vehicle 11, one or more trees 20, or other obstacles having sufficient horizontal and vertical definition. As will be understood by those of ordinary skill in the art, the first sensor 13, being an electro-optical device as discussed above, can use various optical flow algorithms or image processing software to accurately detect the presence of an object in the path of the vehicle 10. Obstacle detection-related information or data from the first sensor 13 can be used to validate the corresponding data or information from the second sensor 17, as discussed below.

Additionally, the first sensor 13 is operable for continuously scanning the line 18 and determining when the vehicle 10 is leaving or driving off of the road surface 16. More particularly, the VRISR system 34 of FIG. 2 is adapted to determine precisely when each of the road wheels 12F crosses the line 18, with the VRISR system 34 of FIG. 2 potentially executing an autonomous control response or action whenever such an event occurs, as will be described in more detail below with reference to FIGS. 3 and 4. This determination can be verified or validated using an optional navigation signal (NAV) from an onboard navigation system according to one embodiment, provided the stored map data and accuracy of the onboard navigation system is sufficient for determining the approximate boundary lines of the road surface 50.

The second sensor 17 can also be placed in or behind a forward portion of the vehicle 10, such as within or behind the grill (not shown). Within the scope of the invention, the second sensor 17 has a scanning zone 22, and is configured as a long-range electromagnetic (EM) scattering device operable for interpreting or measuring the reflected signature of an obstacle in the path of the vehicle 10. The second sensor 17 determines a set of range data which can be used to determine the distance and closing rate to the obstacle.

In one embodiment, the second sensor 17 can be configured as a long range radio detection and ranging device (radar) device. As will be understood by those of ordinary skill in the art, a radar device transmits electromagnetic (EM) waves, typically in the microwave ranges, i.e., greater than 1 GHz. For example, the K band of approximately 20-40 GHz, or the X band of approximately 8.2 to 12.4 GHz, are two of the more frequently utilized microwave frequency ranges for obstacle detection, although other frequency ranges can be selected depending on the particular application. In another embodiment, the second sensor 17 can be configured as a pulsed laser-based light detection and ranging (LiDAR) device, an ultrasonic device, an infrared device, and/or any other suitable EM wave-based detection device capable of detecting an obstacle in a sufficiently different set of frequencies from that of the first scanner 13.

Whatever the frequency, the EM waves comprising the scanning zone 22 of the second sensor 17 are directed toward a potential obstacle on the road surface 16. Depending on the vertical and horizontal definition and composition of the obstacle, the waves are reflected by the obstacle and returned to the radar device in the form of an echo or a signature. The signature allows for a calculation or determination of the distance to the obstacle, with the speed of the vehicle 10 and the changing signature used to determine the closing rate to the obstacle. When the second sensor 17 is alternately configured as a laser-based device, the time delay between transmission and detection of an ultraviolet, infrared, or other laser pulse is used to determine the presence of an obstacle, the distance to the obstacle, its relative speed, and other characteristics.

Referring to FIG. 2, in addition to the respective first and second sensors 13, 17 discussed above, the VRISR system 34 includes an electronic control unit or controller 28. For clarity, in FIG. 2 the first sensor 13 is labeled O for "optical" in while the second sensor 17 is labeled R/L for "radar/LiDAR". Within the scope of the invention the VRISR system 34 can include various inertial and/or vehicle performance sensors which collect a set of vehicle inertial data, including: a brake input sensor 30 connected to a brake input device B, an accelerator position sensor 32 connected to an accelerator input device A, a steering sensor 33 connected to a steering input device 26, and a wheel speed sensor 36 connected to each road wheel 12. The VRISR system 34 can also include another device (D) 38, such as an audio/visual alarm, seat belt tension adjustment mechanism, air bag preparation device, etc., responsive to a control signal Ci. Each of the sensors 13, 17, 30, 32, 33, and 36 transmit, relay, or otherwise communicate a respective signal or set of signals to the controller 28 for use by an algorithm 100, as described in detail below with reference to FIG. 4.

That is, the first sensor 13 continuously transmits an optical signal $O_i$ describing a signature or set of optical data, and the second sensor 17 transmits a signature or set of radar/LiDAR data R/Li. The brake input sensor 30 transmits a brake input signal (arrow Bi) describing the driver's requested braking force via the detected travel and apply force of the brake input device B. The accelerator position sensor 32 transmits an accelerator position or level signal (arrow Ai) describing the apply position or level of the accelerator input device A. The steering sensor 33 measures and transmits a steering angle and/or rate (arrow θs) describing the applied steering angle of the steering input device 26. The wheel speed sensors 36 transmit a measured rotational speed of each road wheel 12 (arrow N). The controller 28 then uses the collective set of input data from the sensors 30, 32, 33, and 36, as well as the known mass of the vehicle 10 of FIG. 1 and a calculated vehicle speed V, to determine a set of vehicle inertial data for use in classifying the VRIS as described below with reference to FIG. 4.

Still referring to FIG. 2, the controller 28 refers broadly to a distributed control module or a central control module, which can include such control modules and capabilities as might be necessary to operate the vehicle 10 in the desired manner. The controller 28 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms and any required sets of calibrated data, such as a table 40 (see FIG. 3) and the algorithm or method 100 of the invention, are resident in the controller 28 or readily accessible thereby. The algorithm 100 and table 40 can be stored in ROM and executed to provide the respective functions of each resident controller.

The vehicle 10 of FIG. 1 includes a conventional electromechanical or hydraulic friction braking system such as a fluid-actuated pad and/or drum style braking system, which is positioned in proximity to each road wheel 12, and adapted to provide a frictional mechanical braking capability. When a driver of the vehicle 10 depresses the braking input device (B), typically configured as a brake pedal, the friction braking system slows the vehicle 10. Within the scope of the invention, the frictional braking system of the vehicle 10 of FIG. 1 responds with at least as much applied braking force as is requested by an operator of the vehicle 10 by depressing the brake input device B, with the controller 28 automatically and selectively increasing the amount of applied braking force under certain predetermined conditions or during a VRIS of a particular classification to thereby provide a supplemental braking level (arrow Bs). When the supplemental braking level (arrow Bs) is activated, the optional device 38 can be simultaneously or concurrently activated as needed. For example, if device 38 is configured as an audio/visual alarm, it can be sounded or illuminated concurrently with the autonomous supplemental braking. These predetermined conditions define a classified VRIS, and will now be described with reference to FIG. 3.

With reference to FIG. 3, the table 40 describes a calibrated set of conditions or statuses for an exemplary embodiment of an autonomous braking event, which can be used as the autonomous control action described above. The table 40 can be accessed by the controller 28 of FIG. 2 to determine when to enable an autonomous braking capability. Within the table 40, column 1 or "road status" refers to the position of the vehicle 10 of FIG. 1 with respect to the road surface 16. A positive (+) symbol indicates that the vehicle 10 is traveling on the road surface 16, and a negative (−) symbol indicates that the vehicle 10, and specifically each of the road wheels 12F of the vehicle 10, has fully crossed the line 18 demarking a boundary of the road surface 16 as described above. The road status of column 1 can be determined by continuously scanning the line 18 using the first sensor 13 to determine when the road wheels 12F have crossed the line 18, as described above. Various image processing algorithms and/or a pattern-recognizing neural network or networks can be used to detect the continuity of the line 18.

In table 40, columns 2 and 3 describe the statuses of the sensors 13 and 17, i.e., whether or not each sensor 13, 17 has detected an obstacle within its respective scanning zone 14, 22 (see FIG. 1). A positive (+) symbol indicates that the sensor 13, 17 has affirmatively detected an obstacle in its scanning zone 14, 22, respectively, while a negative (−) symbol indicates that the sensor 13, 17 has not detected such an obstacle, or that any detected obstacle is not sufficiently large to warrant an autonomous control response. Finally, column 4 of table 40 or "auto braking" refers to the activated/inactivated state or status of autonomous braking capability onboard the vehicle 10 of FIG. 1, with a positive (+) status representing an activated autonomous braking capability and a negative (−) status representing an inactivated autonomous braking capability. Column 4 does not determine how much autonomous braking is provided, but only whether such autonomous braking is enabled or activated, and therefore potentially available as determined by the algorithm or method 100 of FIG. 4.

Still referring to FIG. 3, in rows 1-4 when the vehicle 10 remains on the road surface 16 of FIG. 1, the activation status of autonomous braking is determined based on a combination of the various statuses of the sensors 13 and 17. When the second sensor 17 detects an obstacle in its scanning zone 22, autonomous braking is enabled only under two conditions: (1) when the first sensor 13 is off or is otherwise temporarily disabled or unavailable, and (2) when the first sensor 13 detects an obstacle in its scanning zone 14 concurrent with detection of that obstacle by the second sensor 17.

If either of the respective first and the second sensors 13, 17 does not detect an obstacle in its respective scanning zone 14, 22, autonomous braking is not activated or enabled. The combination of statuses from the sensors 13, 17, as well as the set of vehicle inertial data from the sensors 30, 32, 33, and 36 of FIG. 2, are used by the controller 28 of FIG. 2 to classify the VRIS as described above. The controller 28 can then execute an appropriate control action or response, which can vary depending on the classification of the VRIS, with the classification determined by the values of the various measurements as described below with reference to FIG. 4.

Referring to rows 5-8, the situation differs in one key respect when the road status is negative (−), i.e., when the vehicle 10 of FIG. 1 has left the road surface 16. In this situation, column 4 of row 6 differs from column 4 of corresponding row 2, wherein both of the rows 2 and 6 refer to a positive (+) status of the second sensor 17 and a negative (−) status of the sensor 13. In row 6, however, with the vehicle 10 now traveling on the off-road surface 24 of FIG. 1, autonomous braking is enabled, while in row 2, with the vehicle 10 still traveling on the road surface 16, the same set of statuses for the sensors 13, 17 results in a disabling of autonomous braking. That is, once the vehicle 10 has left the road surface 16 as represented by rows 5-8, the second sensor 17 alone determines the status of the autonomous braking capability.

Figure 4:
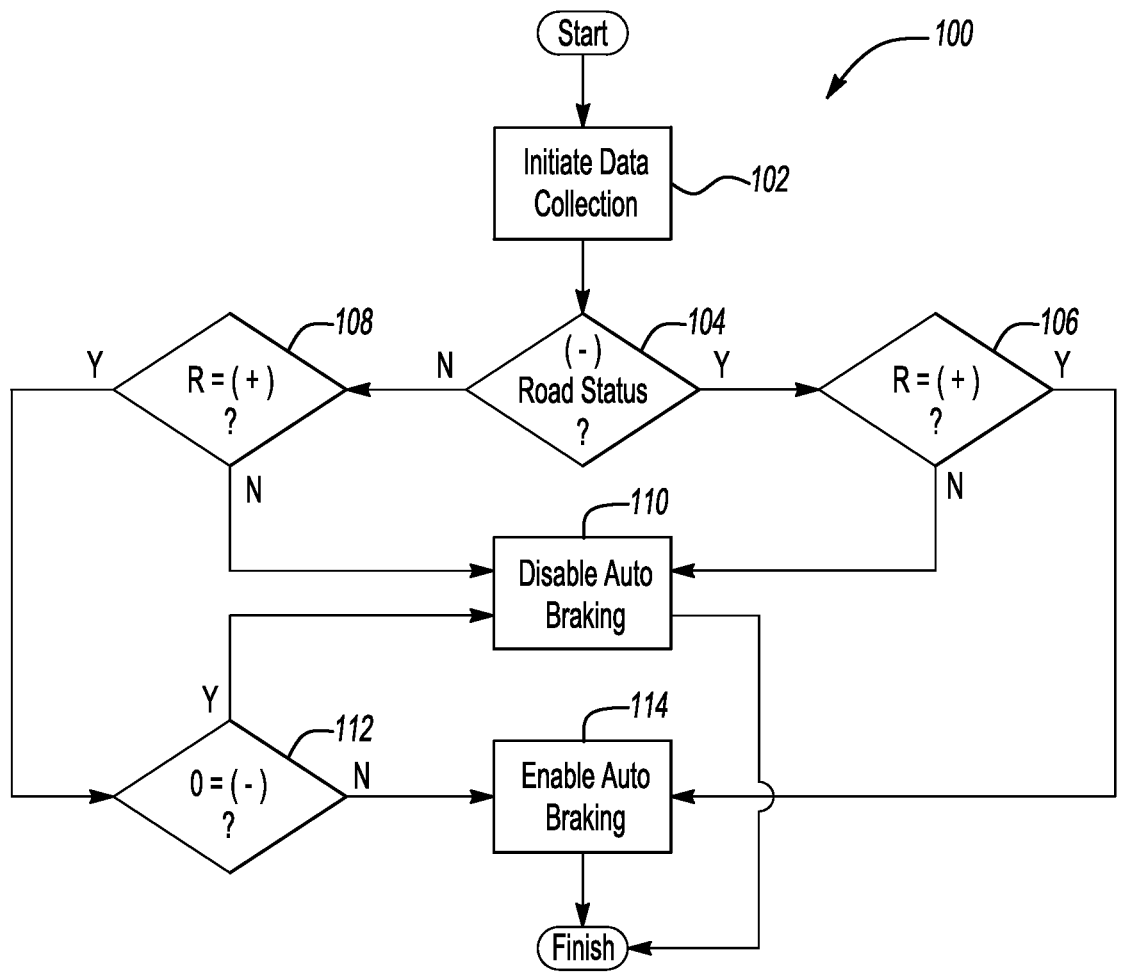
FIG. 4 is a schematic flow chart describing an algorithm or method usable with the vehicle of FIG. 1.

Referring to FIG. 4, the algorithm or method 100 of the invention allows the controller 28 of FIG. 2 to selectively control the autonomous braking of the vehicle 10 of FIG. 1 depending on the classification of the VRIS. The method 100 begins with step 102, wherein data collection is initiated. As used herein, the phrase "data collection" refers to the continuous scanning, monitoring, measurement, or detection of data or other information describing the surrounding environment, i.e., the road and inertial status or VRIS of the vehicle 10 of FIG. 1 using the sensors 13, 17, 30, 32, 33, and 36, as described above. Once data collection has commenced, the method 100 proceeds to step 104.

At step 104, the road status (see column 1 of FIG. 3) is determined and verified by the controller 28 using the optical signal $O_i$ of FIG. 2 as described above. If the road status is negative (−), i.e., if the vehicle 10 of FIG. 1 has left the road surface 16, the method 100 proceeds to step 106. Otherwise, the method 100 proceeds to step 108.

At step 106, the method 100 includes verifying the status of the second sensor 17. If the status of the second sensor 17 is positive (+), i.e., if the second sensor 17 has detected a potential obstacle in its scanning zone 22 as shown in FIG. 1, the method 100 proceeds to step 114. However, if the status of the second sensor 17 is negative (−), the method 100 proceeds to step 110.

At step 108, as with step 106, the method 100 includes verifying the status of the second sensor 17. If the status of the second sensor 17 is positive (+), the method 100 proceeds to step 112. However, if the status of the second sensor 17 is negative (−), the method 100 proceeds to step 110.

At step 110, the method 100 includes temporarily disabling or deactivating autonomous braking capability. Once disabled or deactivated, the method 100 is finished, with any subsequent braking of the vehicle 10 of FIG. 1. conducted exclusively by the driver using the braking input device (B). That is, no additional or supplemental braking is applied autonomously by the controller 28.

At step 112, the method 100 includes verifying the status of the first sensor 13. If the status of the first sensor 13 is negative (−), i.e., if the first sensor 13 does not detect the presence of an obstacle in its scanning zone 14, the method 100 proceeds to step 110. However, if the status of the second sensor 17 is positive (+), the method 100 proceeds to step 114.

At step 114, the method 100 includes enabling or activating autonomous braking capability. Once autonomous braking capability is enabled or activated, the vehicle 10 of FIG. 1. is braked via the braking input level ($B_i$) from the driver using the braking input device (B), as well as using a variable amount of additional braking force provided autonomously by the controller 28 of FIG. 2. That is, the braking input force ($B_i$) from a driver of the vehicle 10 commands a baseline amount of braking force. To this baseline amount of braking force can be added a suitable amount of additional or supplemental braking force ranging anywhere from zero to a predetermined or calibrated maximum. Therefore, a positive (+) autonomous braking status in column 4 of FIG. 3 does not correspond to any particular additional braking force, but rather to an activated or enabled autonomous braking capability.

Within the scope of the invention, the precise amount of additional or supplemental braking providing autonomously by the controller 28 of FIG. 2 can be determined by the controller 28 in response to the values of the various input signals describing the VES and the vehicle's inertial values. Referring again to FIG. 2, these input signals include the signals $O_i$ and $R_i/L_i$ from the sensors 13 and 17, respectively, as well as the accelerator level Ai, the braking input level Bi, the steering angle/steering rate θs, and the wheel speed N. Additional sensors (not shown) can be used to further refine the detail and accuracy of the inertial values, including for example one or more accelerometers and/or gyroscopes. The vehicle velocity, acceleration, mass, closing distance to an obstacle such as the trees 20 of FIG. 1, steering maneuvers, braking input level, etc. can then be compared to a corresponding set of threshold values stored in ROM in a lookup table or other suitable format in the controller 28. The comparison can dictate how much, if any, additional or supplemental braking force is provided autonomously by the controller 28.

For example, a vehicle 10 having a relatively low speed that has left the road surface 16 and is slowly approaching an obstacle, such as the trees 20 of FIG. 1., with a steering angle θs and braking input level Bi sufficient for avoiding the obstacle, can result in an activation of the autonomous braking capability coupled with zero or near zero additional or supplemental braking force. Likewise, a vehicle 10 leaving the road surface 16 having a relatively high speed and quickly approaching an obstacle such as the trees 20 with a steering angle θs and braking input level Bi each insufficient for avoiding the obstacle can result in an automatic activation of the autonomous braking capability coupled with a substantial additional or supplemental braking force. Those of ordinary skill in the art will recognize other possibilities or combinations of the various input signals that could result in a different braking response, depending on the particular design of the vehicle 10 and controller 28 of FIG. 2.

Likewise, those of ordinary skill in the art will appreciate the need to eliminate false-positive classifications by properly identifying when a driver is clearly intending to turn off of a road surface such as road surface 50 of FIG. 1, and is thus intentionally leaving the road surface. In such situations, and also when the driver is traveling on a road surface lacking optically-identifiable boundaries, e.g. the line 18 of FIG. 1, the VRISR system can be disabled. For example, the VRISR system described above can be configured to compare the collective set of input signals, including the vehicle speed, steering wheel angle, road gradient, navigational map data, braking input level, turn signal activation, etc., and make a determination that any departure from a road surface 50 is intentional. Under such circumstances, the VRISR system described above can be automatically and temporarily disabled to prevent misclassification of the VRIS.

While the best modes for carrying out the invention have been described in detail, those familiar with the art to which this invention relates will recognize various alternative designs and embodiments for practicing the invention within the scope of the appended claims.

The invention of claimed is:

1. A vehicle comprising:
a set of road wheels;
a plurality of sensors operable for generating an input data set, said plurality of sensors including:
a first sensor configured to generate an optical scanning beam covering an immediate path of the vehicle and a boundary of a road surface, said first sensor being further configured to scan the boundary of said road surface to determine when said set of road wheels crosses said boundary and to scan the immediate path for an obstacle on the road surface;
a second sensor configured to detect said obstacle and a set of range data to the obstacle; and
at least one additional sensor configured to determine a set of inertial data of the vehicle; and
a controller in communication with said first sensor, said second sensor, and said at least one additional sensor;
wherein said controller is configured for comparing said input data set to a corresponding set of calibrated thresholds, and for automatically increasing an amount of braking force of the vehicle when the vehicle has not crossed said boundary only when
both of the first and second sensors detect the obstacle, and wherein the controller is further configured for automatically increasing the amount of braking force of the vehicle when the vehicle has crossed said boundary only when the second sensor detects the obstacle without respect to whether the first sensor detects the obstacle.

2. The vehicle of claim 1, wherein said first sensor is an electro-optical imaging device and said second sensor is an electromagnetic (EM) wave detection and ranging device.

3. The vehicle of claim 2, wherein said EM wave detection and ranging device is selected from the group consisting essentially of: a radio wave detection and ranging device, an ultraviolet (UV) laser detection and ranging device, a laser-based light detection and ranging (LiDAR) device, and an infrared (IR) laser detection and ranging device.

4. The vehicle of claim 1, wherein said at least one additional sensor includes at least one of: a road wheel speed sensor, a steering angle and rate sensor, a braking input level sensor, and a throttle level sensor.

5. An apparatus for optimizing a collision preparation response in a vehicle having a set of road wheels, the apparatus comprising:
    a plurality of sensors operable for generating an input data set, said plurality of sensors including:
    an electro-optical imaging sensor configured to visually detect an obstacle on a road surface, said electro-optical imaging sensor being further configured to scan a boundary of said road surface to thereby determine when the set of road wheels crosses said boundary;
    an electromagnetic (EM) wave detection and ranging sensor configured to detect said obstacle and determine a set of range data to the obstacle;
    at least one additional sensor for determining a set of inertial data of the vehicle; and
    a controller in communication with said electro-optical imaging sensor, said EM wave detection and ranging sensor, and said at least one additional sensor;
    wherein said controller is configured for comparing said input data set to a corresponding set of calibrated thresholds, and for automatically supplementing a user-generated braking input level of the vehicle as a first control response when
        the electro-optical imaging sensor determines that the road wheels have not crossed the boundary, and both of the electro-optical imaging sensor and the EM wave detection and ranging sensor detect the obstacle, and
        as a second control response when the electro-optical imaging sensor determines that the road wheels have crossed the boundary, the EM wave detection and ranging sensor detects the obstacle without respect to whether the electro-optical imaging sensor detects the obstacle.

6. The apparatus of claim 5, wherein said EM wave detection and ranging sensory device is a radar device having a frequency range greater than approximately 1 Gigahertz (GHz).

7. The apparatus of claim 5, wherein said frequency range is selected from the group consisting of: X-band frequencies and K-band frequencies.

8. The apparatus of claim 5, wherein the vehicle includes a steering input device and a braking input device, and
    wherein said at least one additional sensor includes: a steering angle and rate sensor configured to measure an instantaneous steering angle and a steering angle rate of the steering input device, and a braking input sensor configured to measure said user-generated braking input level.

9. The apparatus of claim 5, wherein said EM wave detection and ranging sensory device is a pulsed laser device.

10. The apparatus of claim 5, further comprising an audio/visual alarm device, wherein said audio/visual alarm device is automatically activated when said first control response is executed.

11. A method of optimizing a collision preparation response in a vehicle, the method comprising:
    measuring a set of vehicle inertial data including a user-generated braking input level;
    detecting an obstacle using an electromagnetic (EM) wave detection and ranging device;
    scanning a boundary of a road surface and an immediate path of the vehicle using an electro-optical device to determine when a set of road wheels of the vehicle crosses said boundary and detect the obstacle, respectively;
    automatically adding, using said controller, a supplemental braking force to said user-generated braking input level as a first control response when
        the electro-optical device determines that the road wheels have not crossed the boundary, and both of the electro-optical device and EM wave detection and ranging device detect the obstacle; and
    automatically adding, using said controller, a supplemental braking force to said user-generated braking input level as a second control response when the electro-optical device determines that the road wheels have crossed the boundary and the EM wave detection and ranging device detects the obstacle without respect to whether the electro-optical device detects the obstacle.

12. The method of claim 11, further comprising:
    comparing said set of vehicle inertial data to a set of calibrated thresholds; and
    automatically applying a different amount of said supplemental braking force depending at least in part on said set of vehicle inertial data.

13. The method of claim 12, wherein said detecting an obstacle using a EM wave detection and ranging device includes detecting said obstacle using at least one of a radar and a laser based light detection and ranging (LiDAR) device.

14. The method of claim 13, wherein said scanning a boundary of a road surface using an electro-optical device includes continuously scanning said boundary using a digital camera to thereby generate an optical signal, and then processing said optical signal through one of an image processing algorithm and a neural network.

* * * * *